H. M. PREACHER.
AERIAL RAILWAY.
APPLICATION FILED MAY 1, 1912.

1,047,699.

Patented Dec. 17, 1912.

Witnesses:
Christ Feinle, Jr.

Inventor,
Henry M. Preacher.
By Victor J. Evans,
Attorney

UNITED STATES PATENT OFFICE.

HENRY M. PREACHER, OF BRUNSON, SOUTH CAROLINA.

AERIAL RAILWAY.

1,047,699.  Specification of Letters Patent.  Patented Dec. 17, 1912.

Application filed May 1, 1912. Serial No. 694,345.

*To all whom it may concern:*

Be it known that I, HENRY M. PREACHER, a citizen of the United States, residing at Brunson, in the county of Hampton and State of South Carolina, have invented new and useful Improvements in Aerial Railways, of which the following is a specification.

This invention relates to aerial railways and the principal object of the invention is the provision of a simple and efficient device of this character which may be cheaply constructed and installed and which is especially designed for the transportation of linemen from one point to another where the lines do not follow the road and which enables them to conveniently locate any rupture of the lines and repair the same without climbing the poles or crawling among the messenger wires in hand propelled cars.

Further objects of this invention will appear as the following specific description is read in connection with the accompanying drawing, which forms a part of this application, and in which:—

Figure 1:
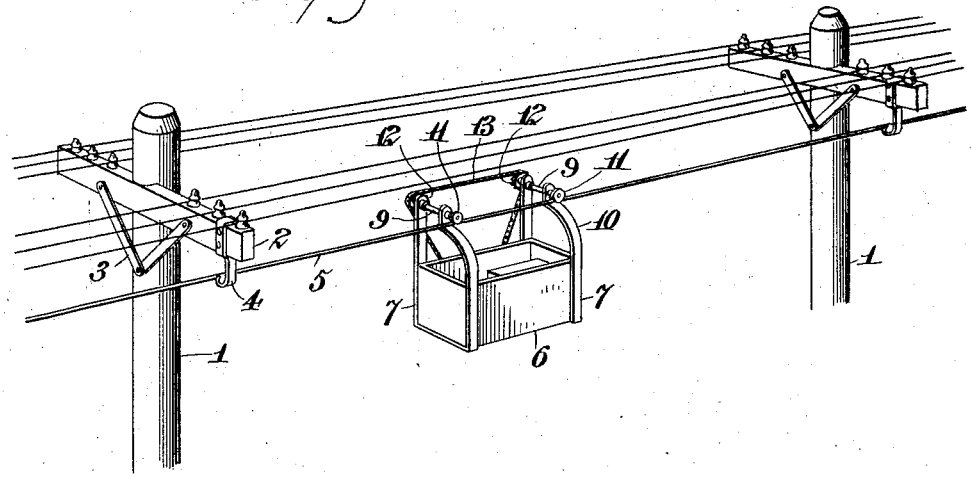
Figure 2:
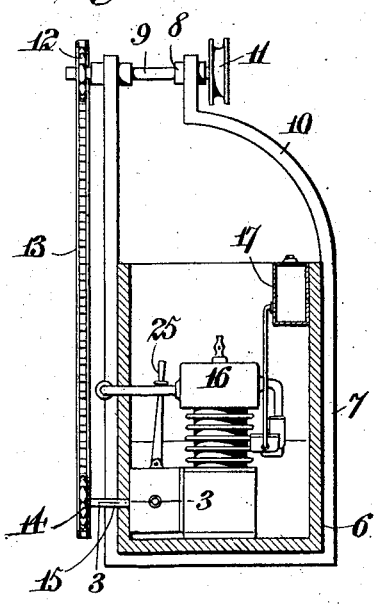
Figure 3:
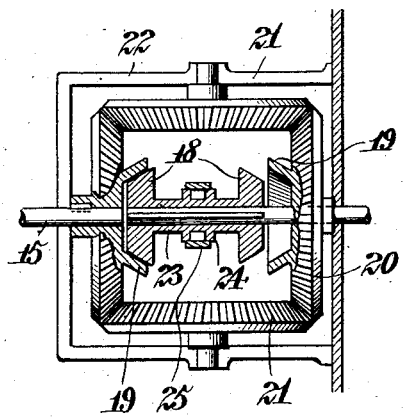

Figure 1 is a perspective view on a small scale. Fig. 2 is a vertical sectional view through the car on an enlarged scale. Fig. 3 is a section on an enlarged scale taken on the line 3—3 of Fig. 2.

Referring more particularly to the drawing, 1 represents an ordinary telegraph pole to which is secured a cross arm 2 braced in the usual manner by diagonal struts 3. Depending from the cross arm is a supporting bracket 4 to which is secured an ordinary messenger cable 5 in the manner similar to that illustrated in Fig. 1. This type of structure is extremely old in the art and needs no further description. Suspended from and adapted to travel over the wire is a car 6 which is supported in yoke members 7 whose upper ends have bearings 8 mounted therein to receive the shafts 9. The forward leg of each yoke member is inwardly curved, as shown at 10, so as to bring the cable pulleys 11 which are connected to the shaft 9 immediately above the center of the car, whereby the same will hang perpendicularly at all times. The opposite ends of the shaft from that to which the pulleys are secured have attached thereto suitable sprocket wheels 12 over which travels a sprocket chain 13 passing at its lower portion over a sprocket wheel 14 carried upon the driving shaft 15 of a motor 16, here shown in the form of an internal combustion engine whose source of fuel supply is obtained from the tank 17. Intermediate the engine and the sprocket wheel 14, the shaft 15 has secured thereto a pair of friction members 18 adapted to mesh or engage with cups or concave disks 19 keyed to the shaft and carrying beveled gears 20 which mesh with similar gears 21 mounted in the casing 22. The friction members 18 are carried by the sleeve 23 which is splined upon the shaft and provided with a central collar 24 adapted to be engaged by the shifting lever 25. This reverse mechanism is provided so that the engine can be connected to drive the shaft 15 in either direction, it being of course understood that the shaft is in two parts, as shown, or the engine can be caused to run idly without driving the car in either direction.

It will be noticed that the driving sprocket and the sprocket chain are arranged upon the outside of the car. This gives the operator more room to work in and avoids any liability of accident. Furthermore, this arrangement permits the linemen to stand up between the messenger wire and the sprocket chain.

What is claimed is:—

In a device of the class described, the combination with supporting posts having cross arms thereon, of brackets depending from said cross arms, a cable connecting the brackets, a car, supporting arms projecting from the sides of the car, shafts journaled in the upper ends of the arms, pulleys upon the inner ends of said shafts adapted to engage the cable, a motor arranged in the car and having a driving shaft projecting through the side thereof, and a connection between the driving shaft and the pulley shafts lying outside the car.

In testimony whereof I affix my signature in presence of two witnesses.

HENRY M. PREACHER.

Witnesses:
S. A. AGNEW,
LORING TERRY.